United States Patent Office 3,351,097
Patented Nov. 7, 1967

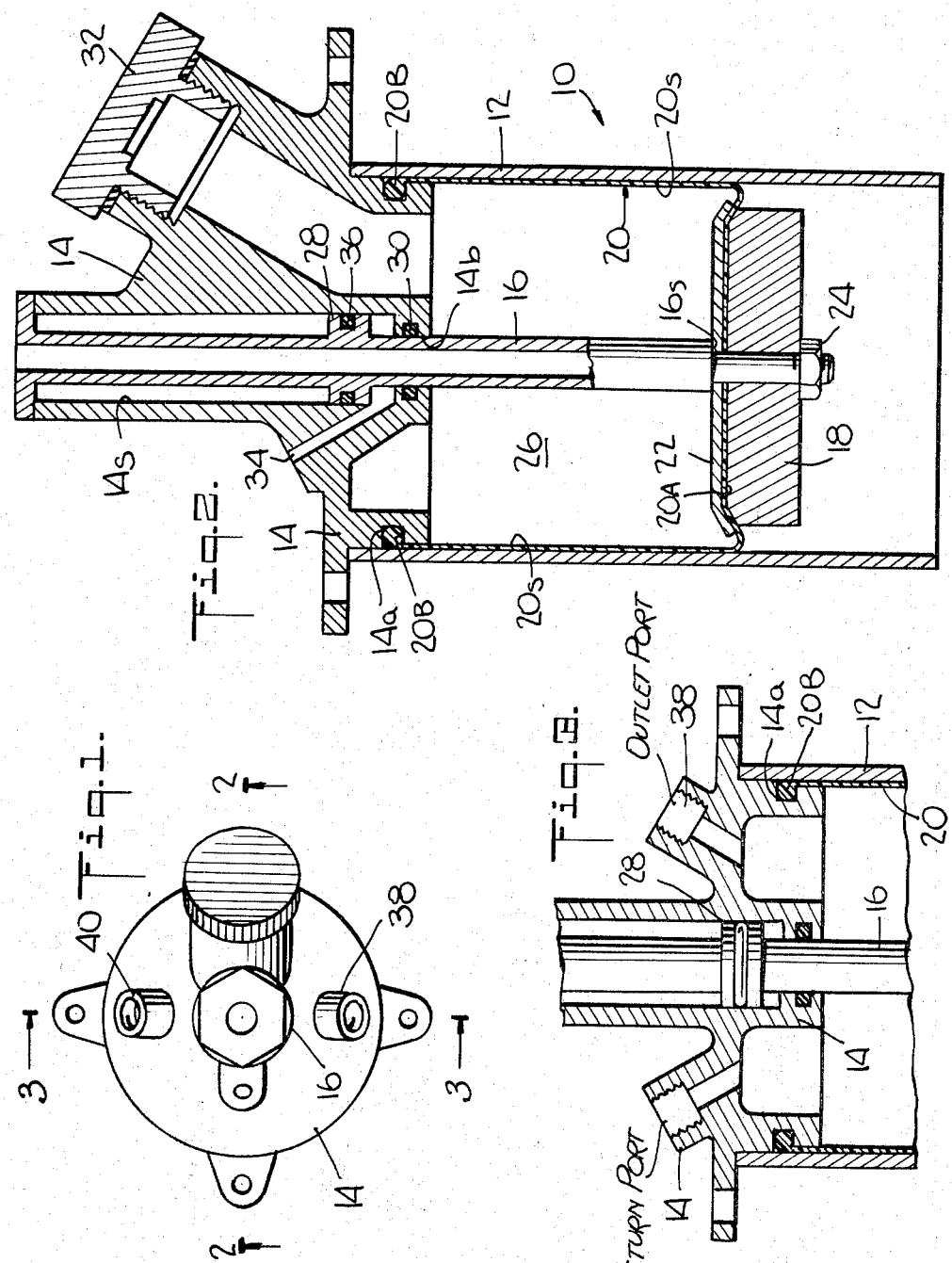

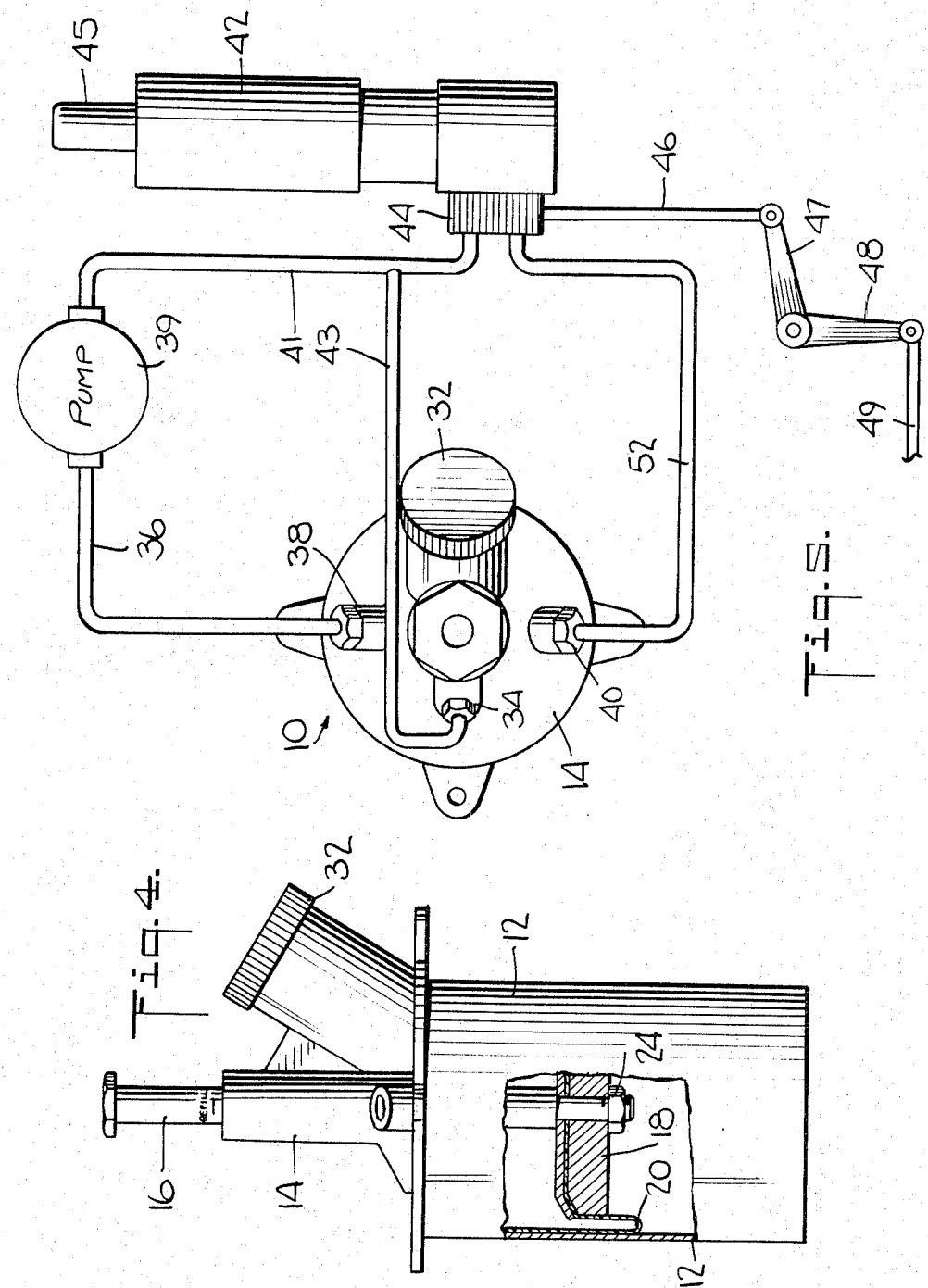

3,351,097
HYDRAULIC RESERVOIR
James R. Moran, Fort Worth, Tex., assignor to Bell Aerospace Corporation, Wheatfield, N.Y., a corporation of Delaware
Filed July 27, 1964, Ser. No. 385,199
2 Claims. (Cl. 138—30)

This invention relates in general to hydraulic reservoirs and more particularly to a pressurized hydraulic reservoir as employed in aircraft hydraulic systems.

The purpose of the reservoir in a hydraulic system is to furnish the hydraulic pump with a continuing adequate supply of hydraulic fluid. There are pressurized and non-pressurized reservoirs. A non-pressurized reservoir depends upon a gravity flow of fluid from the reservoir to the pump and system. A pressurized reservoir is one where the fluid is subjected to an external force greater than atmospheric pressure, which force then tends to force the fluid to flow through the suction line interconnecting the reservoir to the pump.

A pressurized reservoir is required under many different circumstances. If the pump is located remotely from the reservoir, friction developed from the flow of oil through the lengthy hydraulic lines will offer resistance which tends to prevent an adequate flow of oil to the pump unless additional pressure is provided. A failure to obtain an adequate flow of oil to the pump for this or other reasons will cause cavitation so that the fluid flow will be not only inadequate but also uneven. In other applications, the pump may be located above the reservoir so that a force is required to lift the oil from the reservoir against the force of gravity to the pump level. In general, a high-speed pump will require pressurization in order to supply the high fluid flow rate required. In aircraft applications, the hydraulic system must be able to perform in all attitudes (including those attitudes where the reservoir may be upside down). Thus the reservoir is usually maintained under pressure in order to insure continuous flow of fluid from the reservoir to the pump.

Presently used pressurized reservoirs fall into two general categories. In one category there are those reservoirs with which a separate air pressure source is used to supply the additional required pressure. In the second category are those employing the so-called "boot strap" type of operation where the hydraulic system itself is employed to provide the pressure necessary for the reservoir. The advantage of the "boot strap" design is that it does away with the necessity for having a separate source of pressure. One of the disadvantages of the "boot strap" type of design is that it generally provides inadequate fluid flow on starting up the system. After the hydraulic system has come into operation, more than adequate pressure is available to be supplied to the reservoir for maintaining the fluid under pressure. However, the system is not self-starting in that there is no pressure reserve to supply pressure when the system starts up. An auxiliary source of pressure, such as an accumulator, may be used in such circumstances but that requires additional equipment.

Accordingly, it is a major purpose of this invention to provide a hydraulic reservoir for aircraft use which may be incorporated in a system employing a "boot strap" design without requiring additional sources of pressure.

It is a related purpose of this invention to supply a pressurized hydraulic reservoir which when coupled into a hydraulic system will provide adequate fluid flow to the hydraulic pump when the pump is started.

It is typical in the "boot strap" pressurized reservoirs to employ a piston head to exert pressure on the fluid in the fluid chamber. This piston head must be fitted to the chamber walls with a fluid tight seal such as an O-ring. The fit required between the piston head and chamber walls to avoid fluid leakage results in considerable friction which must be overcome before the piston can be moved sufficiently to cause it to exert pressure on the hydraulic fluid in the reservoir. On start-up, there is very little pressure available and thus the friction cannot be readily overcome without the employment of some separate auxiliary source of pressure.

Accordingly, it is a more detailed purpose of this invention to supply a pressurized hydraulic reservoir in which there is little or no friction between the movable piston and the stationary portions of the reservoir.

In brief, this invention involves a cylindrical side wall, open on one end and topped by an end cap on the other end. A piston is deployed within the side wall, generally coaxial with the side wall, so that the fluid chamber is defined by the piston head, the side wall and the end cap. To contain the fluid, a flexible thin wall bladder or bellows is employed which has a side wall that runs flush with the inside of the main side wall and which has one closed end that runs flush along the surface of the piston head. The flexible thin wall bladder contains the hydraulic fluid and is readily deformed by movement of the piston head. Because there is no friction between the piston head and the main side wall, even relatively slight pressure can move the piston head so as to displace the hydraulic fluid from the reservoir chamber into the hydraulic system lines. The open end of the hydraulic bladder is sealed to the end cap so that fluid will not leak out from that end.

Other objects and purposes of this invention will become apparent from a consideration of the following detailed description and drawings, in which:

FIG. 1 is a top plan view of a hydraulic reservoir constructed in accordance with this invention;

FIG. 2 is a cross-section taken along the plane 2—2 of FIG. 1, showing the reservoir in the condition where it is full of hydraulic fluid;

FIG. 3 is a cross-section taken along the plane 3—3 of FIG. 1;

FIG. 4 is a side view in partial elevation and partial cross-section showing the reservoir of FIG. 2 partially empty; and FIG. 5 is a mechanical schematic illustration of the reservoir of FIG. 2 installed in a typical aircraft hydraulic control system.

With reference to the embodiment illustrated in FIG. 1–4 (which may be most clearly seen in FIG. 2), the reservoir 10 includes a cylindrical side wall 12 which is open on one end and has an end cap 14 on the other end. A piston rod 16 and piston head 18 are disposed coaxially within the side wall 12 so that the piston 18 is free to move axially within the side wall 12.

A flexible cylindrical bladder 20 is deployed inside of the cylindrical side wall 12 in such a fashion that the side wall 20s of the bladder 20 lies flush along the inner surface of the main side wall 12. The bladder 20 has a closed end 20A which is laid flush along the inside surface of the piston head 18. A plate 22, between a shoulder 16s on the piston rod 16 and the end portion 20A of the flexible bladder 20 holds the bladder end 20A to the piston head 18. For ease of assembly, the lower portion of the piston rod 16 is threaded and the piston head 18, bladder end 20A, as well as the plate 22, all have central openings which permit them to be placed on one end of the piston rod 16 and held tightly thereon between the shoulder 16s and a nut 24.

The upper and open end 20B of the bladder 20 is sealed to the end cap 14 in a groove 14a. The bulb portion at the end 20B of the bladder is squeezed into the groove 14a in the cap 14 and thereby compressed between the cap 14 and the cylinder wall 12. This holds the bladder 20 in position as well as sealing the space between the cap 14 and the cylinder 12. Of course, the bladder 20 does not otherwise attach to the wall of the cylinder as it must be free to roll up with the movement of the piston head 18.

In this fashion, the bladder 20 and end cap 14 define the cavity 26 which contains the fluid in the reservoir 10. The side wall 12 and piston head 18 serve to give structural support to the bladder 20 but, because it is the bladder 20 that defines the actual cavity 26, there is no need for a close fit between the piston head 18 and wall 12. Thus all friction between the piston head 18 and wall 12 is eliminated.

The piston rod 16 rides along the wall portion 14b of the end cap 14 and has a flange 28 which rides along the surface 14s of the extended portion of the end cap 14. In this fashion, the alignment of the piston rod 16 is maintained so that the piston head 18 remains properly positioned within the side wall 12. An O-ring seal 30 keeps fluid within the chamber 26 from leaking out along the sides of the piston rod 16. A filler cap 32 screws down on the end cap 14 and is removed only when additional fluid is needed in the fluid chamber 26 or when other repair is required. As may be seen from FIG. 4, the piston rod 17 may be marked with an indication of when a refill is necessary.

It is intended, in the embodiment illustrated, that the fluid chamber 26 operate under pressure. This pressure is achieved through the pressure developed within the hydraulic system to which this reservoir 10 is connected. The pressure developed in the hydraulic system is fed through the port 34 in the end cap 14 to impinge on one side of the flange 28 so as to exert a force on the flange 28 that tends to pull the piston head 18 toward the end cap 14 and thus maintain pressure on the fluid within the chamber 26.

An O-ring seal 36 prevents the fluid under pressure (from the port 34) from escaping around the flange 28.

Although some friction is developed between the O-ring seals 30, 36 and the surfaces on which they ride, that friction is not significant compared to the friction which would be developed between an O-ring seal on the sides of a piston head (such as 18) and the adjoining side wall (such as the side wall 20), the circumference of the piston head 18 being many times greater than the circumference of the piston rod 16. Thus, the design of this invention greatly reduces the amount of friction that must be overcome in order to cause the piston head 18 to exert pressure on the fluid in the fluid chamber 26 and thus makes it possible for a "boot strap" pressurized reservoir to be employed without requiring an auxiliary source of pressure during start-up.

As may be seen in FIGS. 1 and 3, the end cap 14 contains the outlet port 38 and return port 40 for the reservoir.

FIG. 4 illustrates the operation of the reservoir of this invention within a hydraulic system. FIG. 4 shows the outlet port 38 connected to a hydraulic line 37 which leads to the inlet of a pump 39. A hydraulic line 41 on the outlet of the pump 39 leads through another line 43 to the port 34. When the pump 39 is turned on, there is enough fluid in the system so that a small amount of pressure (8 inches of Hg, for example) over atmospheric may be developed in the lines 41 and 43 and thus at the port 34 to exert some pressure on the piston rod 16. Since the piston arrangement 16, 18 does not have to overcome friction between the piston head 18 and side wall 12, this relatively small amount of pressure is sufficient to provide additional fluid to the pump 39 which then is able to develop still additional pressure. In this fashion, the reservoir of this invention is adapted to the so-called "boot strap" operation.

FIG. 4 shows a connection of the circuit to a single operative device, such as a power cylinder 42. A standard hydraulic switch 44 determines whether the rod 45 will be extended or retracted. The position of the hydraulic switch 44 may be controlled through a series of linkages 46, 47, 48 and 49, controlled by the pilot or other operator. A return line 52 returns fluid to the return port 40 of the reservoir 10.

Although one embodiment of this invention has been shown, it should be understood that other embodiments would be obvious to those skilled in this art.

For example, it is convenient, for purposes of assembly, that the closed end 20A of the flexible bladder 20 be held onto the piston head 18 by a rigid plate 22. However, the bladder end 20A could be bonded to the piston head 18. Also, the end 20A could be connected to the outer surface of the piston head 18 rather than the inner surface as shown. All that is required is that the closed end 20A be so mechanically connected, directly or indirectly, to the piston head 18 that it tracks with the piston head 18.

The use of the flange 28 and port 34 as the means for supplying system pressure to the piston 16, 18 is one very convenient method of obtaining the desired result. However, many variations may be made in the technique of supplying pressure to the piston 16, 18. It is even possible, under certain circumstances, that the outside pressure applied to the piston head 18 is derived from some source other than the hydraulic system. For example, if there is available an outside source of pressure which is sufficient to overcome the frictional forces that would normally be developed between a piston head and a side wall, then the basic design of this invention would have application even though the source of the force on the piston head 18 is not from within the hydraulic system.

In the specification and claims, the end 20A of the bladder 20 is frequently referred to as a closed end as contrasted from the open end at the rim 20B. It should be understood herein that the end 20A is a closed end only when in combination with the rest of the reservoir. Thus the end 20A has a central opening to accommodate the piston rod 16. However, when assembled, the combination of the piston rod 16, the shoulder 16s and the plate 22 serves to effectively seal the chamber 26 and thus the end 20A is in fact operationally a closed end.

The bladder 20 material used and dimensions employed may be varied within wide limits. What is required is that the material be flexible enough and the wall 20s thickness thin enough to permit folding the wall under very small pressures. In one operable embodiment a fluorinated silicone bladder 20, four inches long, four inches in diameter and having a 0.030" wall 20s thickness was employed. The particular pump 38 used in that embodiment pulled about 8" Hg during start-up.

What is claimed is:

1. In a hydraulic system, a pressurized hydraulic reservoir adapted to operate at all attitudes comprising:

a cylindrical housing wall, an end cap at one end of said housing wall, a piston having a piston head and piston rod, said piston head being mounted for reciprocal axial movement within said housing wall, a flexible bladder having an open end, a closed end and a cylindrical side wall, said open end of said bladder being sealed to said end cap, said cylindrical side wall of said bladder being disposed flush along said inner surface of said cylindrical housing wall, said closed end being attached to one surface of said piston head whereby said closed end will reciprocate with said piston head, the diameter of said piston head being sufficiently smaller than the inside diameter of said housing wall so as to permit axial movement of said piston head and said closed end of said bladder without developing appreciable friction with said housing wall, a flange on said piston rod, said flange having a diameter substantially less than the diameter of said piston head, a cylindrical side wall in sealing relation with said flange, said flange being movable axially within said side wall, and means for applying system pressure to one side of said flange, whereby the only significant friction impeding movement of said piston head within said housing wall is the friction between said flange and said side wall.

2. A pressurized hydraulic reservoir adapted to operate at all attitudes comprising:

a cylindrical housing, an end cap at one end of said housing, a flexible cylindrical bladder lying flush along the inner wall of said housing, said bladder having an open end sealed to said end cap and a closed end spaced from said end cap, said bladder and said end cap defining the main fluid chamber of said reservoir, a main piston head attached to said closed end of said bladder, the diameter of said main piston head being sufficiently smaller than the inside diameter of said housing wall so as to permit axial movement of said piston head and said closed end of said bladder without developing friction with said inner wall of said housing, a piston rod attached to said main piston head and extending through said fluid chamber, said piston rod being in sealing relationship with an opening in said end cap to move axially relative to said end cap, a smaller piston-like flange on said piston rod, said flange being positioned on a portion of said rod that extends outside of said fluid chamber within said end cap, a cylindrical side wall in said end cap in sealing relation with said flange, said flange and said piston rod being movable axially within said side wall, and a port within said end cap in communication with one end of the chamber defined by said cylindrical side wall, whereby system pressure may be applied through said port to one side of said flange to cause said piston rod to move axially in response to system pressure thereby contracting or expanding said fluid chamber in response to system pressure.

References Cited

UNITED STATES PATENTS

| | | | |
|---|---|---|---|
| 2,450,031 | 9/1948 | Berger | 138—31 |
| 2,721,446 | 10/1955 | Bumb | 138—31 X |
| 2,745,357 | 5/1956 | Strayer | 138—31 X |
| 2,809,596 | 10/1957 | Sullwold et al. | 138—31 X |
| 3,028,881 | 5/1962 | Koomey et al. | 138—30 |
| 3,075,558 | 1/1963 | Von Forell | 138—30 |
| 3,250,225 | 5/1966 | Taplin | 103—150 X |

C. L. HOUCK, *Assistant Examiner.*

LAVERNE D. GEIGER, *Primary Examiner.*